Figure 4:
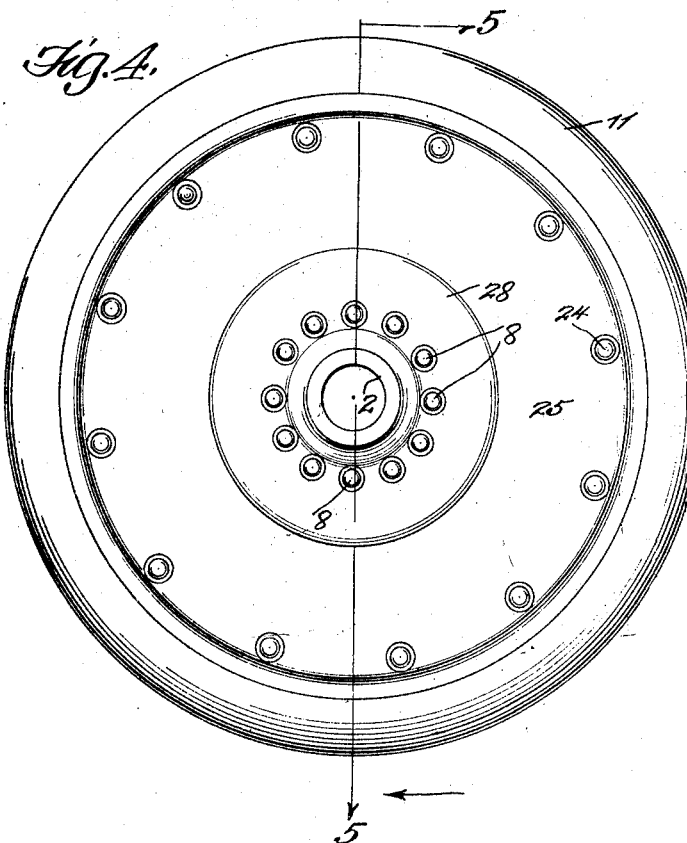

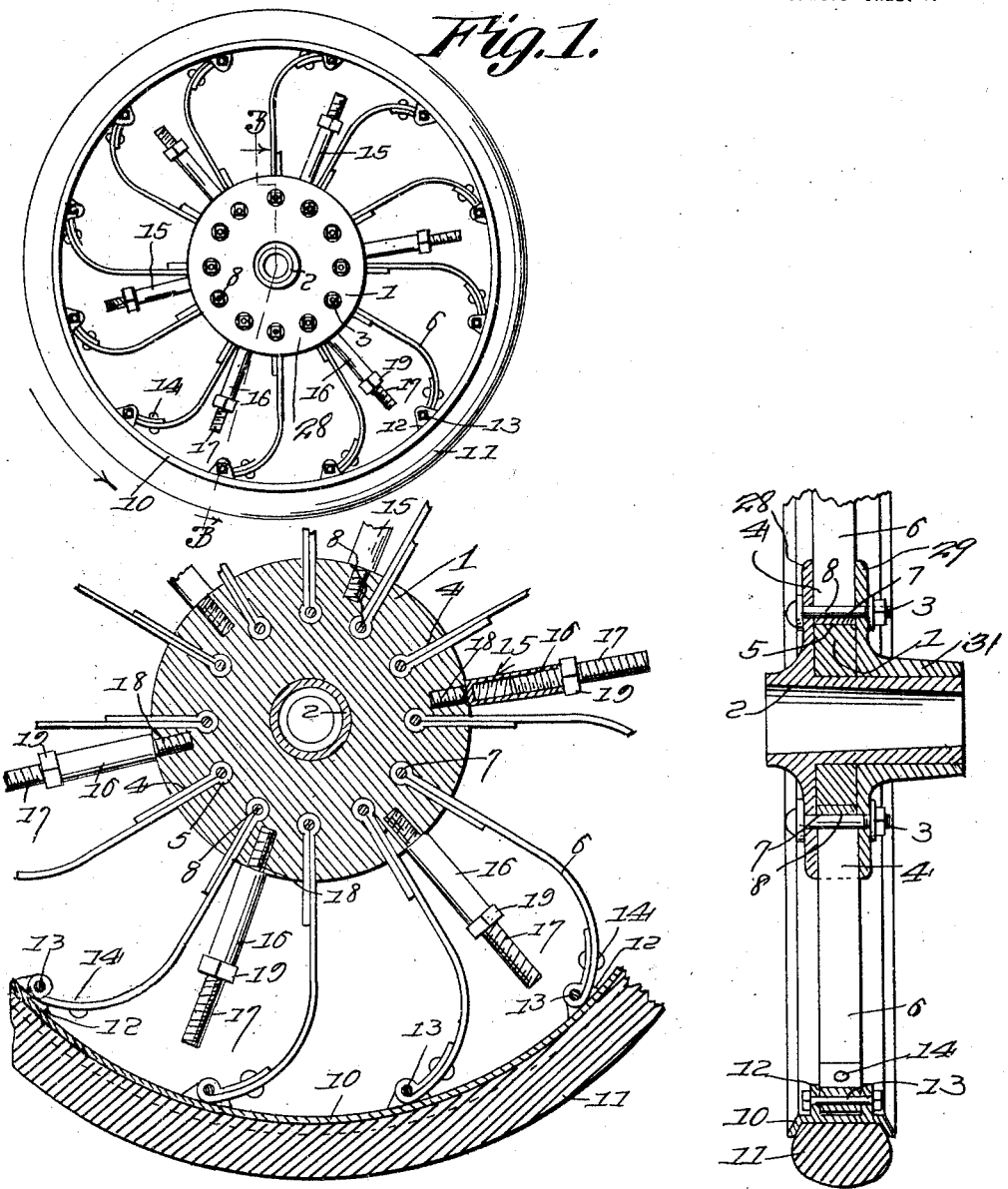

W. H. SCHLAKE.
RESILIENT WHEEL.
APPLICATION FILED JULY 28, 1920.

1,373,101.

Patented Mar. 29, 1921.
2 SHEETS—SHEET 2.

Inventor
William H. Schlake,
By Watson E. Coleman
Attorney

UNITED STATES PATENT OFFICE.

WILLIAM H. SCHLAKE, OF YUMA, COLORADO.

RESILIENT WHEEL.

1,373,101.   Specification of Letters Patent.   Patented Mar. 29, 1921.

Application filed July 28, 1920. Serial No. 399,481.

*To all whom it may concern:*

Be it known that I, WILLIAM H. SCHLAKE, a citizen of the United States, residing at Yuma, in the county of Yuma and State of Colorado, have invented certain new and useful Improvements in Resilient Wheels, of which the following is a specification, reference being had to the accompanying drawings.

This invention relates to an improved resilient wheel and an object is to provide a device of this kind which is simple, efficient and practical in construction and capable of being cheaply made and sold at a reasonable profit.

Another object is to provide a wheel that will operate satisfactorily on muddy road beds.

Still another object is the provision of a resilient wheel in which the resilient spokes are so shaped as to insure resiliency and at the same time to permit the mud and the like to drop off the spokes as the wheel is in motion.

A further object is to provide a relatively broad rim and relatively broad resilient spokes whereby the wheel may operate uniformly and to withstand lateral strains. The relatively broad rim acts as a bearing for the resilient spokes to coöperate with as the wheel is in motion.

A still further object of the invention is to provide a resilient wheel which will insure elasticity of the spokes and wherein improved means is included for fastening the spokes to the hub member of the wheel.

Additionally the invention aims to provide means for governing the resiliency or elasticity of the spokes.

A further object is to provide a resilient wheel of this character wherein a housing or casing is provided for the resilient parts of the spokes thereby excluding dirt, dust or other foreign matter, it being obvious that the interior of the casing or housing may contain a supply of lubricant in order to lubricate the parts.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 5:
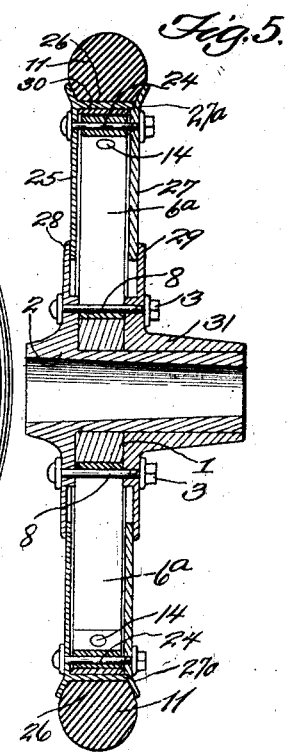

Figure 1 is a view in side elevation of a resilient wheel constructed in accordance with the invention, Fig. 2 is a view of a portion of the resilient wheel showing the hub member in section, Fig. 3 is a sectional view on line 3—3 of Fig. 1, Fig. 4 is a view in side elevation of a modified form of a resilient wheel wherein the resilient spokes of the wheel are housed in a casing, Fig. 5 is a sectional view through the same more clearly showing the mounting of the spokes in the housing or casing.

Referring to the drawings, 1 designates a hub member which may be any suitable shape or configuration and constructed of wood or a suitable fiber or a composition thereof. Obviously the hub may be constructed of metal. In either case, however, the hub member is provided with the usual bushing 2 adapted for engagement with the spindle of a wheel. The bushing 2 extends through the hub member 1 and is provided with an annular flange 28 engaging on one side of the hub member 1.

A hub sleeve 31 is provided and is designed to telescope the bushing 2. The hub sleeve 31 engages the opposite side of the hub member and is provided with a circular flange 29 which is opposite to the flange 28. The hub member 1 is provided with a plurality of slots 4 which extend radially of the hub and their inner ends terminate in cylindrical enlargements 5. Although resilient spokes are provided and may be constructed of any suitable material, for instance such as spring rods, they are preferably constructed of relatively wide spring metal as indicated.

The spokes may be of any suitable curved shape such as that illustrated and in such a direction that when the wheel is in motion traveling on muddy road beds, the mud will readily drop from the spokes. In order to connect the resilient spokes to the hub member the inner portions of the spokes are rolled or bent upon themselves to form hollow enlargements 7 which engage the enlarged openings in the inner ends of the radial slots. The folded parts of the spokes engage radially in the slots of the hub member and in order to prevent lateral movement of the inner connected ends of the spokes transversely relatively to the hub member suitable bolts 8 engage through the hollow enlargements of the inner ends of the spokes and through the flanges 28 and 29 and are provided with nuts 3 to hold the parts in place.

It will be noted that the flanges 28 and 29 of the bushing and hub sleeve overlie the opposite ends of the enlargements at the inner ends of the spokes and prevent lateral movement thereof. By reason of the folded parts of the metal of the spokes engaging the radial slots of the hub member, the spokes are reinforced to insure rigidity at their inner portions.

The resilient wheel also includes a rim 10 which may be constructed of any suitable yieldable spring or sheet metal and is provided with a channel for the reception of a hard rubber tire 11 thereby providing a sound tread for the wheel. Projecting from the marginal portion of the rim are oppositely arranged ears 12 and engaging through the ears are bolts 13 which constitute means for connecting the outer ends of the spokes to the rim. In fact, the outer end portions of the spokes are bent upon themselves in surrounding relation to the bolts passing through the ears and the bent portions of the spokes are riveted or otherwise secured at 14 to the body of the spokes. It will be noted that the outer end portions of the spokes are capable of slight movements relatively to the bolts, namely slight pivotal movements relatively as the spokes yield as the hub moves downwardly as a result of the load on the axle. Suitable adjusters are provided and although it is obvious that they may be fastened to the spokes, it has been found preferable to mount the adjusters on the hub member.

These adjusters 15 are connected to the hub member as shown, between certain of each two of the spokes and are designed primarily for retarding or limiting the resiliency of the spokes of the wheel. For instance, each of the adjusters consists of two parts 16 and 17 and the part 16 is fastened at 18 to the hub member while the part 17 is threaded into the part 16 there being a suitable nut 19 on the part 17 to lock the two sections or parts relatively to each other.

It will be noted that these adjusters or members for limiting the resiliency of the spokes are disposed radially relatively to the hub member so that as the hub member moves downwardly due to the load exerted upon the axle, the outer extremities of the sections or parts 17 will contact with the rim and thereby retard the downward movement of the hub member relatively to the rim. It is obvious that the wheel may be used with or without the adjusters. It will be seen that the spokes are curved or bowed in a direction with the rotation of the wheel so that when the tread is traveling on muddy road beds, the mud or the like will readily drop from the spokes as they move in an arcuate upward direction at the rear of the wheel.

In Figs. 4 and 5 a modified form of resilient wheel is illustrated and in this form of wheel the resilient parts are housed in a casing or drum as shown. The concentric opposite walls of the casing receive bolts 24 on which the outer ends of the curved portions of the spokes 6ª are connected. One of the concentric walls 25 of the housing is formed integral with the rim 26 of the housing while the other concentric wall 27 of the housing is removable. The nuts which are carried by the bolt 24 may be easily removed permitting the concentric wall 27 to be detached. In this modified construction of wheel, the spokes are connected to the hub member 1 in a manner similar to that shown in the other figures. However, in the constructions shown in Figs. 4 and 5 the opposing concentric walls of the housing engage between the annular plates or flanges 28 and 29 so as to exclude the dust and foreign matter from the casing.

These flanges 28 and 29 are spaced from the hub member 1 so as to permit the opposite concentric walls of the housing to readily move as the hub of the wheel is depressed owing to the load supported by the axle, not shown. Furthermore, it will be noted that the opposite walls of the housing are provided with openings large enough to permit of the movement of the hub during the action of the wheel since the load will act to depress upon the axle. If desired, a sufficient deposit of lubricant may be placed on the interior of the housing or casing and owing to the centrifugal force this lubricant will flow around the inner portion of the rim parts of the wheel. A rim band 30 is arranged in the housing or casing intermediate the bolts 24 and the rim proper of the housing or casing.

The invention having been set forth, what is claimed as new and useful is:—

1. In a resilient wheel construction, a hub member, a rim concentric thereto and including a tread, resilient spokes connecting the hub and the rim, interiorly threaded tubular members connected to the hub and extending radially therefrom substantially directly in the rear of certain of the spokes, and elements threaded into the tubular members adjustably and adapted to engage the rim under the weight imparted on the hub member, to limit the movement of the hub member, and thereby govern the resiliency of the wheel.

2. In a resilient wheel construction, a hub member, a rim including a tread, resilient spokes connecting the hub member and the rim, radial tubular members connected to the hub member substantially directly in rear of certain of the spokes, and radial elements adjustably and axially connected to the tubular members, whereby they may be set to contact with the rim under the pressure imparted on the hub, in order to govern the resiliency of the wheel.

3. In a resilient wheel construction, a hub member, a rim including a tread, resilient spokes connecting the hub member and the rim, radial tubular members connected to the hub member substantially directly in rear of certain of the spokes, and radial elements adjustably and axially conducted to the tubular members, whereby they may be set to contact with the rim under the pressure imparted on the hub, in order to govern the resiliency of the wheel, and means for locking the elements in their adjustments relatively to the tubular members.

In testimony whereof I hereunto affix my signature.

WILLIAM H. SCHLAKE.